United States Patent
Shiiba

[11] Patent Number: 5,021,909
[45] Date of Patent: Jun. 4, 1991

[54] YOKE TYPE THIN-FILM MAGNETIC HEAD AND METHOD FOR SUPPRESSING BARKHAUSEN NOISE

[75] Inventor: Kengo Shiiba, Nara, Japan

[73] Assignee: Sharp Kabushiki Kaisha, Osaka, Japan

[21] Appl. No.: 340,755

[22] Filed: Apr. 19, 1989

[30] Foreign Application Priority Data

Apr. 20, 1988 [JP] Japan .................. 63-97484

[51] Int. Cl.$^5$ .................. G11B 5/127; G11B 5/33
[52] U.S. Cl. .................. 360/113; 360/110; 338/32 R; 324/252
[58] Field of Search .................. 360/113, 110, 111; 336/32 R; 324/252

[56] References Cited

FOREIGN PATENT DOCUMENTS 3644388 12/1986 Fed. Rep. of Germany .
58-192392 11/1983 Japan .
59-112422  6/1984 Japan .
63-96713  4/1988 Japan .

OTHER PUBLICATIONS

"Self-Bias Magneto Resistive Read Head", Matsushita Elec. Ind. Co., Ltd., Noboru NOMURA et al., pp. 15-22.

Primary Examiner—Aristotelis M. Psitos
Assistant Examiner—Alfonso Garcia

[57] ABSTRACT

A yoke type thin-film magneto-resistive heat includes a magneto-resistive element that detects the magnetic field generated in the magnetic recording medium as resistance changes, a yoke, that leads magnetic flux from the head gap to the above mentioned magneto-resistive element, a DC magnetic field application system, that applies a desirable weak magnetic field to the above mentioned longitudinal direction of the magneto-resistive element, and a conductor, that applies a desirable bias magnetic field to the above mentioned magneto-resistive element in the strip width direction. The easy axis of magnetization of the magneto-resistive element is inclined in a range of 20°-40° to the mentioned longitudinal direction of the magneto-resistive element, so that, anisotropic angle dispersion conditions are relaxed, at the same time, by applying a desirable bias magnetic field to the magneto-resistive element in the strip width direction. Also, by shifting the operating point to a point having excellent linearity, Barkhausen noise, caused by magnetization switching generated in the magnetic field area with the same direction as the bias magnetic field direction, can be suppressed, and the reproducing output signal can be of high fidelity.

16 Claims, 6 Drawing Sheets

YOKE TYPE THIN-FILM MAGNETIC HEAD AND METHOD FOR SUPPRESSING BARKHAUSEN NOISE

FIELD OF THE INVENTION

This invention is related to the yoke type thin-film magneto-resistive head (hereinafter called "YMR head"), which detects signals recorded in a magnetic recording medium by using a magneto-resistive element (hereinafter called "MR element") which has a ferromagnetic film magneto-resistive effect applied thereto.

BACKGROUND OF THE INVENTION

The structure of the YMR head, which is well known and applied, is indicated in FIG. 7. The upper Yoke (1 and 5) is usually made of about 0.5-1.0 μm permalloy film, and structures the magnetic flux introduction leading the signal magnetic field generated in the magnetic recording medium to the MR element (2). Ferromagnetic film (3) has large magnetic coercive force and high electric conductivity. The ferromagnetic film 3 is made of Co-P, Ni-Co, and Ni-Co-P and so on, and has a film thickness of 1000-2000 Å.

The lead conductor (4) is made of Al-Cu film or another conductive metal film, with a film thickness of 1000-2000 Å. Located below the above mentioned MR element (2) is the conductor (6), made of Al-Cu film or another conductive metal film, which is set to apply a bias magnetic field to the MR element. The lower yoke (7) is made of a substrate with high magnetic permeability. For this magnetic substrate, polycrystal Ni-Zn ferrite substrate, single crystal or polycrystal Mn-Zn ferrite substrate is normally used. The head gap (10) is set at about 0.2-0.3 μm, since the minimum recording wave length actually used is about 0.5 μm. Also at a location close to the head gap is located the magnetic recording medium (9), as illustrated in FIG. 8. Between the magnetic recording medium (9) and the head gap (10), a spacing (8) is formed.

In a YMR head of this structure, the direction of the easy axis of magnetization of MR the element (2) is set along the longitudinal direction of the MR element (2) when the MR element is fabricated. The detection of the signal magnetic field generated from the above mentioned magnetic recording medium (9) is performed by a flowing sense current along the longitudinal direction of the MR element (2), sensing voltage changes which occur at both ends of such an MR element. The MR element (2) operating point is shifted to a point providing excellent linearity by applying a desirable bias magnetic field, generated by a flowing current through the conductor (6) to the MR element. Also, by ferromagnetic exchange coupling between the above ferromagnetic film (3) and the MR element (2), a weak magnetic field is applied in the longitudinal direction of the MR element (2). This weak magnetic field puts the MR element (2) into a single magnetic domain condition, and suppresses Barkhausen noise from occurring by preventing the MR element (2) magnetization from discontinuously changing.

In conventional YMR heads, generally all directions of the easy axis of magnetization in the entire area of MR element (2) are not in the same direction. This is because the angle dispersion of the easy axis of magnetization tends to occur when the MR element (2) is made, or when the above mentioned head gap (10) and upper yoke (1 and 5) are formed. This causes the easy axis dispersion in each area of the MR element (2). It is difficult to prevent this dispersion. Suppose that the direction of the easy axis of magnetization of points a, b, c, d, and e of MR element, (2) are in the arrowhead (→) directions, as illustrated in FIG. 9. The weak magnetic field direction, the longitudinal direction of the MR element (2) caused by ferromagnetic film (3), is graphically illustrated to be from left to right, that is, in the direction of arrows. Then the magnetization curve of the MR element (2) strip width direction in the individual a, b, c, d, and e points are illustrated by (a)-(e) of FIG. 10 respectively.

In the ΔR/R curve corresponding to such an MR element (2) reproducing output, discontinuous jumps occur in parts of the ΔR/R curve by responding to magnetic transition in the MR element (2), as illustrated in FIG. 2(f) which generates Barkhausen noise. At the same time, if the above mentioned direction of the easy axis of magnetization is set along the longitudinal direction when the MR element (2) is made, the distribution of the direction of the easy axis of magnetization in the MR element (2) becomes distributed in both positive and negative directions of the longitudinal direction.

Consequently, on the axis of the abscissa for the ΔR/R curve, that is, on both negative and positive sides of the magnetic field Ha, for the signal magnetic field, discontinuous jumps occur. Therefore when the MR element (2) operating point is shifted to a point having excellent linearity by a bias magnetic field, a problem results where Barkhausen noise occurs in whatever positive or negative magnetic field direction that an operating point is shifted.

SUMMARY OF THE INVENTION

An object of this invention is to offer a YMR head which can achieve a reproduced output signal having good linearity and high fidelity by suppressing Barkhausen noise, which is contained in the reproduced output signal, by inclining the magnetic easY axis of the MR element by 20°-40° C. from the MR element longitudinal direction. This is based on the attention given to magneto-resistive characteristic polarity changes according to the angle made by the direction of the easy axis of magnetization of the MR element, and the signal magnetic field direction.

The above mentioned Barkhausen noise that usually occurs is caused by the shift of the magnetic domain wall, that is, the border surface, of magnetization, where magnetization directions in the magnetic substance differ. Since Barkhausen noise causes discontinuous jumps in both negative and positive areas of the magneto-resistive characteristics, the reproduced output signal has discontinuous jumps.

On the other hand, the magneto-resistive characteristics of the MR elements have a characteristic like a Gaussian distribution curve, in which the shape of the curve broadens toward the bottom. Hence, a part with excellent linearity exists, and a reproduced output signal proportional to the signal magnetic field can be attained by applying a required bias magnetic field. This is caused by the influence of diamagnetic fields, which occur at both side edges of the MR elements.

However, in the YMR head, in which the MR element is located more towards the rear position than the contact plane with the magnetic recording medium, the above mentioned diamagnetic field rarely occurs, which is the cause of non-linearity of reproduced output signals. In order to avoid non-linear components in the MR element reproduced output signals, structuring is very complicated. When considering conditions in which the magnetic head must be compact in order to increase memory capacity, the structure should be simple.

Another object of this invention is to offer a YMR head which can achieve undistorted reproduced output signals having excellent linearity, by shifting discontinuous jumps in the above mentioned reproduced output signal, which can not be prevented onlY by shifting the operating point to a point having excellent linearity of the MR element by applying a bias magnetic field to the MR element in the strip width direction, to one of the positive or negative areas.

Still another object of this invention is to make the magnetic head itself compact and simple in structure, and to offer a YMR head which can prevent reproduced output signals from becoming non-linear.

To accomplish these objects, the special features of an embodiment of the present invention include setting the easy axis of magnetization of the above mentioned MR element by inclining the YMR head 20°-40° C. in the MR element longitudinal direction. The YMR comprises MR elements that detect signal magnetic fields generated in the magnetic recording medium as a resistance change, a yoke, which leads magnetic flux from the head gap to the above mentioned MR element, a DC magnetic field application system, which applies a desirable weak magnetic field in the above mentioned MR element longitudinal direction, and a conductor, which applies a desirable bias magnetic field to the above mentioned MR element in the strip width direction.

The above mentioned magnetic recording medium can be a magnetic tape or a disk, similar to the type used in audio or video tape recorders et cetera, for example. The angle of the easY axis of magnetization in the above mentioned MR element can be inclined in either direction of the positive or negative side longitudinal directions.

BRIEF DESCRIPTION OF THE DRAWINGS

The present invention will become more fully understood from the detailed description given hereinbelow in the accompanying drawings which are given by way of illustrations only, and thus are not limited of the present invention, and wherein:

FIG. 2 (f) is an $\Delta R/R$ curve diagram that corresponds to the reproduced output of the MR element;

FIG. 10 (f) is an $\Delta R/R$ wave diagram corresponding to the reproduced output of the MR element.

DESCRIPTION OF THE EMBODIMENTS

An explanation of examples for embodiment of this invention follows, based on FIGS. 1 to 8. For convenience sake, an explanation is again provided using FIG. 7 and 8, and the same symbols in FIG. 1 correspond to the symbols of FIGS. 7 and 8.

Figure 7:
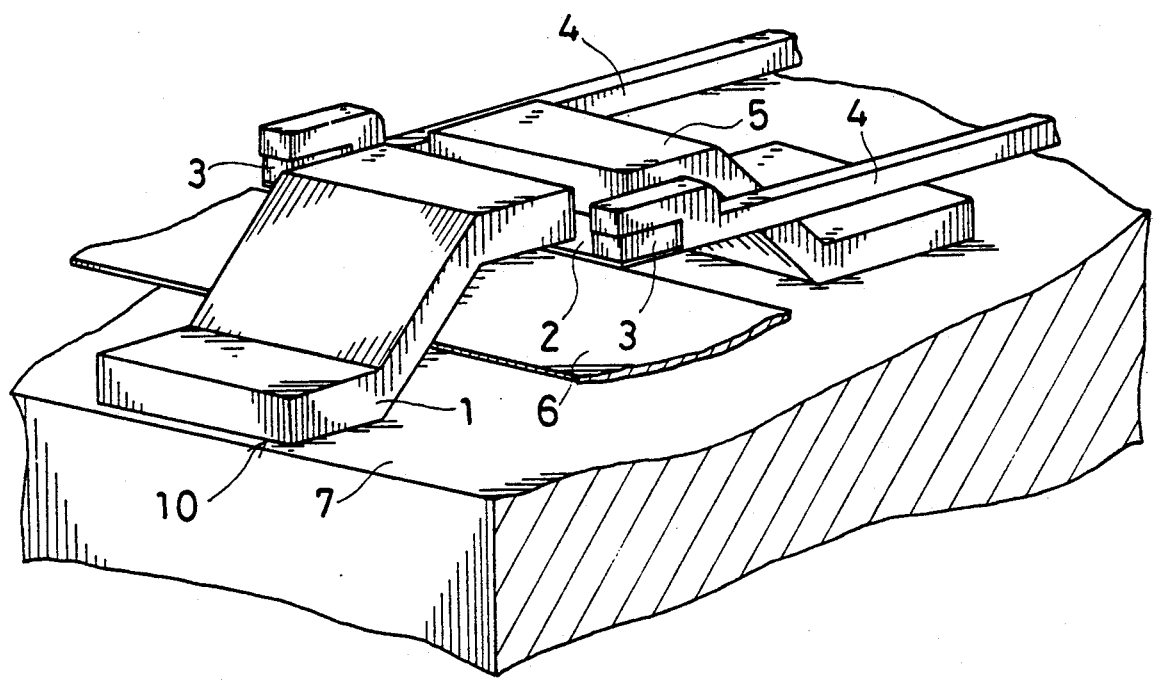
FIG. 7 is a perspective view illustrating the current well known and conventional YMR head structure.
Figure 8:
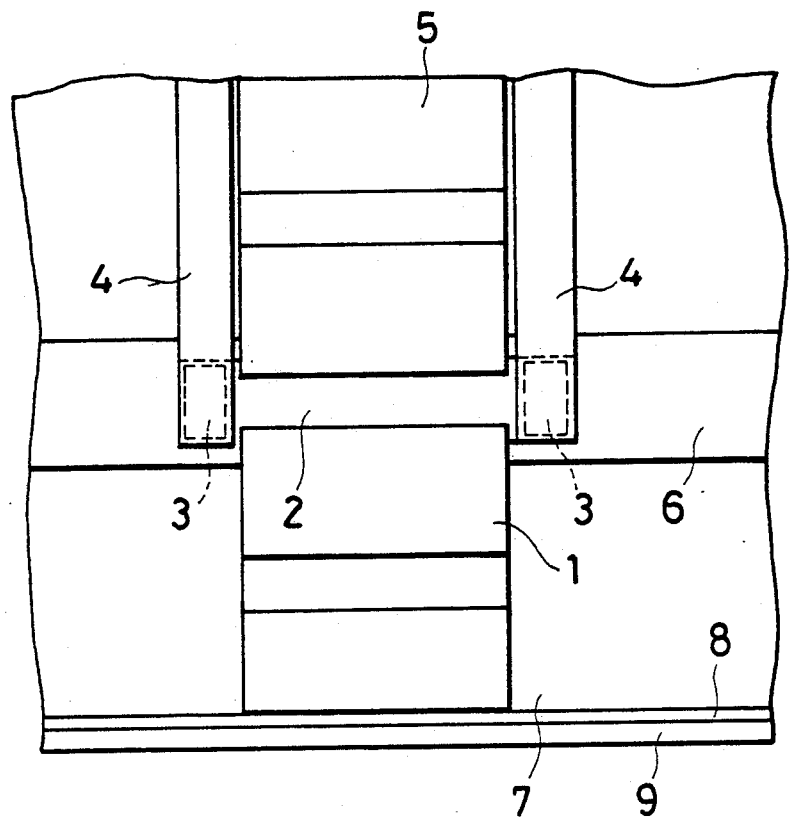
FIG. 8 is a plan view of the current well known and conventional YMR head.
Figure 9:
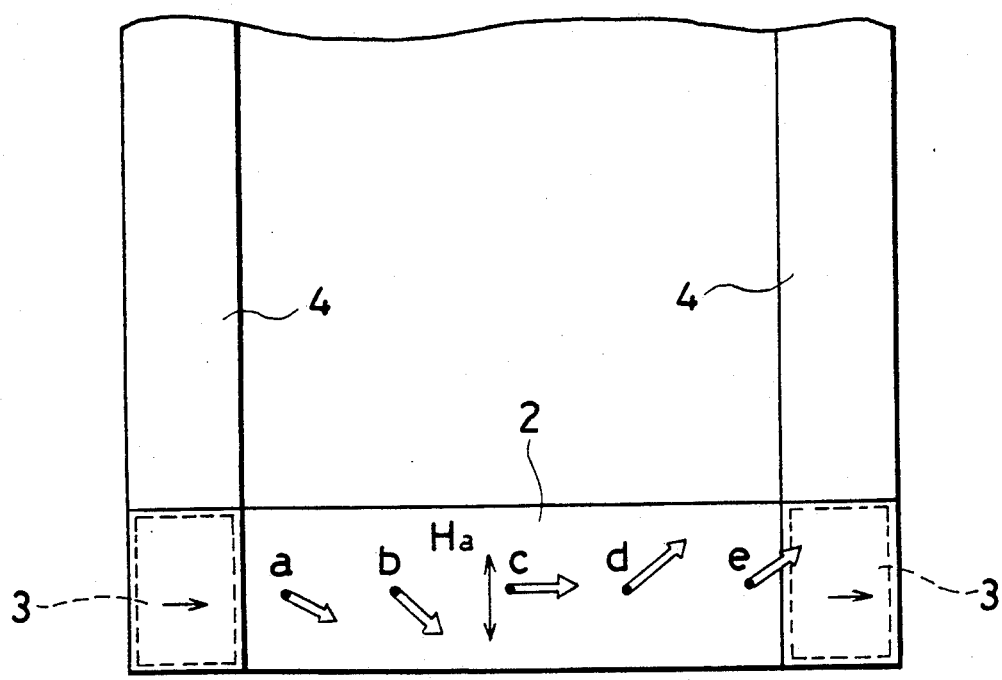
FIG. 9 is an explanatory diagram illustrating currently used examples and the distribution of the magnetic easy axis.
Figure 10A:
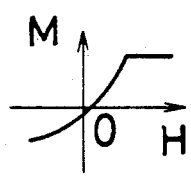
FIGS. 10 (a) to (e) are wave diagrams of MR element magnetization curves in the strip width direction for individual a-e points of FIG. 9.
Figure 10B:
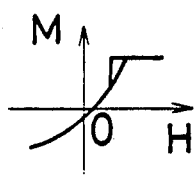
Figure 10C:
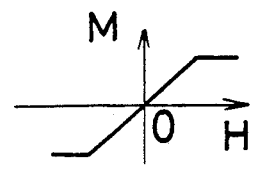
Figure 10D:
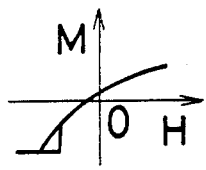
Figure 10E:
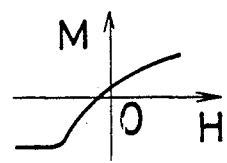
Figure 10F:
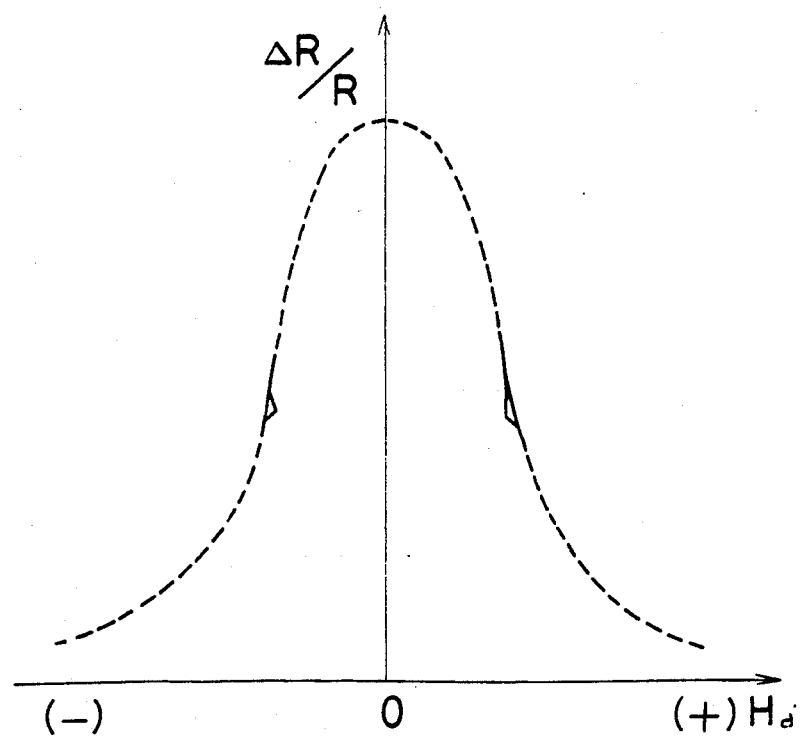

The yoke type thin-film magneto-resistive head (hereinafter called "YMR head") related to this invention, as illustrated in FIGS. 7 and 8, is equipped with a magneto-resistive element (hereinafter called "MR element") (2) which detects the signal magnetic field generated in a magnetic recording medium (9) as a resistance change, an upper yoke (1 and 5), which leads the signal magnetic flux from a head gap (10) to the above mentioned MR element (2), a ferromagnetic film (3) as a DC magnetic field application system, which applies a desirable weak magnetic field along the longitudinal direction of the MR element (2) in order to make the MR element (2) a single magnetic domain, and a conductor (6), which applies the desirable bias magnetic field to the MR element (2) in the strip width direction. In such a YMR head, the direction of the easy axis of magnetization in the MR element (2), as indicated in FIG. 1, is inclined 3° clockwise to the MR element (2) longitudinal direction.

In the above mentioned structure, a weak magnetic field is applied to the MR element (2) in the direction of the arrows, that is, as graphically expressed in a left to right direction, by the above mentioned ferromagnetic film (3). Concerning the direction of the easy axis of magnetization in the MR element (2), in an MR element individual part, almost a similar degree of angle dispersion is given in both the positive and negative direction to the direction of the set up easy axis of magnetization. Here, if the maximum inclination degree of a local easy axis of magnetization caused by this dispersion of angle is ±30° or so, the direction of the easy axis of magnetization is distributed in the range of 0°-60° C. to the longitudinal direction in the MR element total area. For example, at the point on the MR element (2), the easy axis of magnetization inclines about 60° to the longitudinal direction, and at the point e, the easy axis of magnetization is almost in the same direction as the longitudinal direction. As a consequence, the area, where the direction of the easy axis of magnetization is inclined counterclockwise to the longitudinal direction, does not exist, in this example.

At this time, the magnetization curve of the MR element strip width direction at the individual a, b, c, d, and e points come to be (a)-(e) respectively, as illustrated in FIG. 2. The $\Delta R/R$ curve corresponding to the MR element reproduced output, illustrated in FIG. 2 (f) causes discontinuous jumps to a part of the curve, only in the negative side area of the magnetic field Ha. As a consequence, when the MR element (2) operating point is shifted to a point having excellent linearity by a bias magnetic field, if a bias magnetic field is applied such that the operation point is set in the positive side area of the magnetic field Ha, the occurrence of Barkhausen noise can be avoided when the YMR head reproduces a signal magnetic field.

Figure 1:
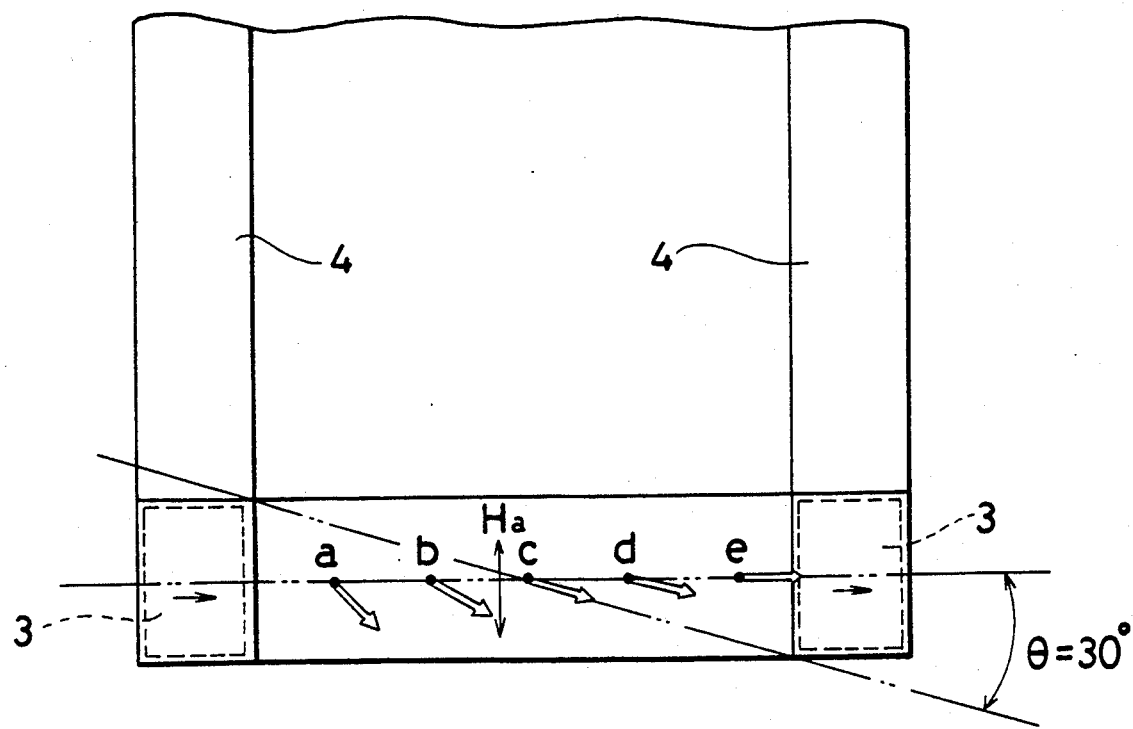
FIG. 1 is an explanatory diagram illustrating the distribution of the magnetic easY axis when the anisotropic inclination angle of the magnetic easy axis $\theta$ to the longitudinal direction of MR element is set at 30°.
Figure 2A:
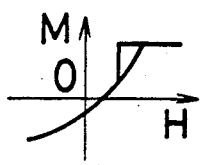
FIGS. 2 (a) to (e) are wave diagrams of magnetization curves for the MR elements of individual a-e points of FIG. 1 in strip width directions.
Figure 2B:
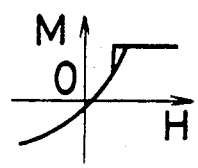
Figure 2C:
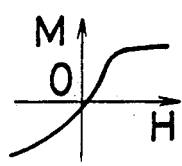
Figure 2D:
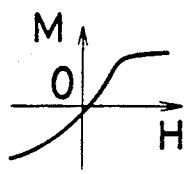
Figure 2E:
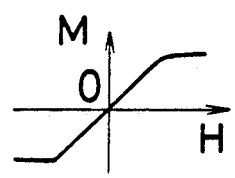
Figure 2F:
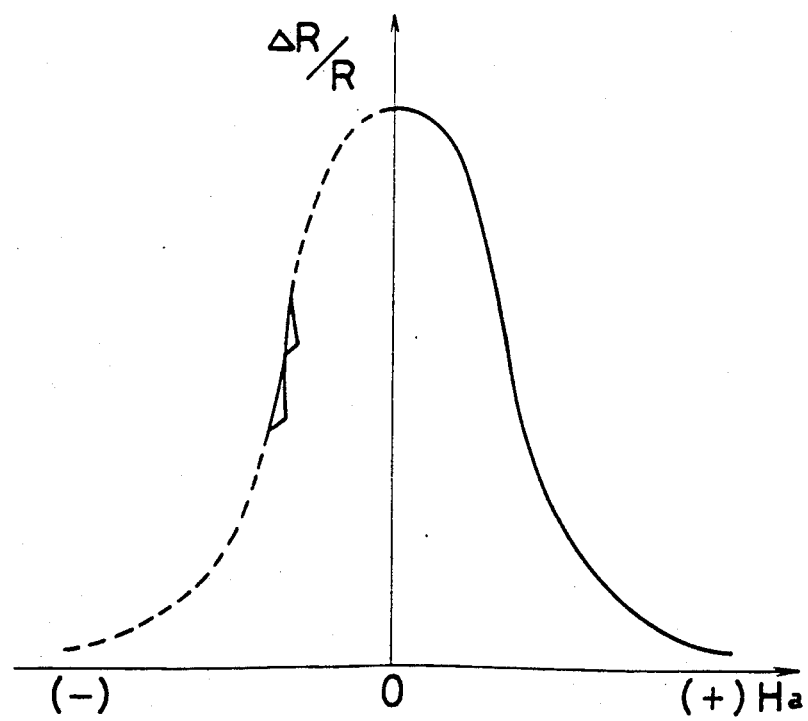

Besides, when an MR element (2) is made, if the easy axis of magnetization is inclined 30° counterclockwise, opposite the axis illustrated in FIG. 1, and other conditions remain the same, in the ΔR/R curve, discontinuous jumps occur at the positive side area of the magnetic field Ha, and, as in FIG. 2 (f), the result is opposite in the positive and negative areas of the magnetic field Ha. In this case, if a bias magnetic field is applied such that the MR element (2) operating point is set in the negative side of the magnetic field Ha, Barkhausen noise will not occur in the reproduced output signals.

The next explanation concerns the manner of determining the inclination angle of the easy axis of magnetization to the longitudinal direction (hereinafter called "anisotropic inclination angle"), when the MR element (2) is made.

Figure 3:
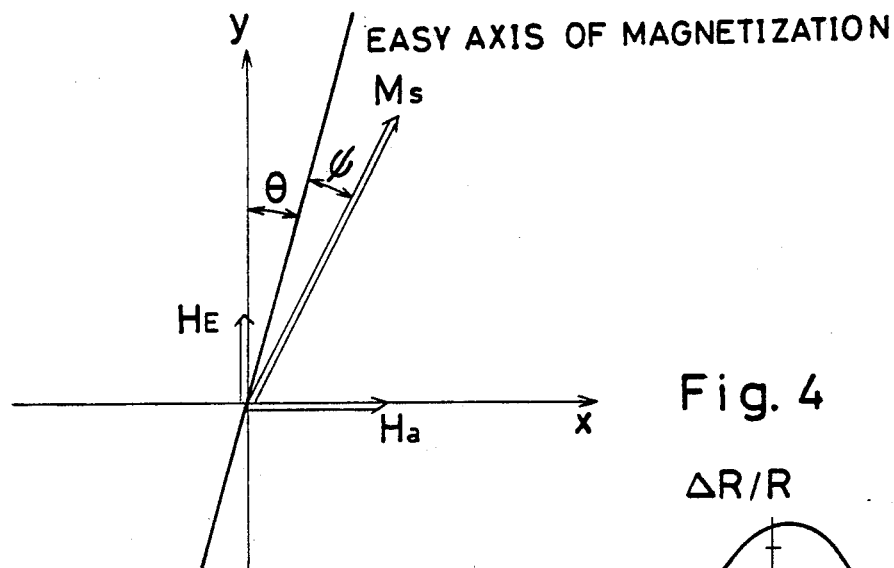
FIG. 3 is a concept diagram which illustrates a single magnetic domain model.

The MR element (2) in the YMR head responds to magnetic signals in small diamagnetic field conditions due to magnetic coupling of the upper side yoke (1 and 5) and lower side yoke (7). Also, because of the weak magnetic field applied to the MR element (2) by ferromagnetic film (3) with a high coercive force, the MR element (2) is in a single magnetic domain condition. Considering these points, the appropriate value of an anisotropic inclination angle can be estimated by using a single magnetic domain model, as illustrated in FIG. 3. In FIG. 3, an anisotropic inclination angle $\theta$, a weak magnetic field $H_E$ applied to the MR element (2) by the ferromagnetic film (3), the saturation magnetization $M_S$ of the MR element, and an external magnetic field Ha corresponding to the signal magnetic field are illustrated.

Here, based on the characteristics of the MR element (2) experimentally made, the magnetization $M_S$ rotation angle $\phi$ to the easy axis of magnetization is calculated in this manner: when $M_S$=796 [emu/cc] and the anisotropic magnetic field $H_K$=4.0 [Oe], concerning a certain appropriate value $H_E$, the total anisotropic energy of magnetization $M_S$, magneto-static energy of magnetization $M_S$ and $H_E$, the magneto-static energy of magnetization $M_S$ and Ha reach a minimum. Then, as illustrated in FIG. 4 to 6, three kinds of ΔR/R curves are attained according to the value of anisotropic inclination angle $\theta$.

Figure 4:
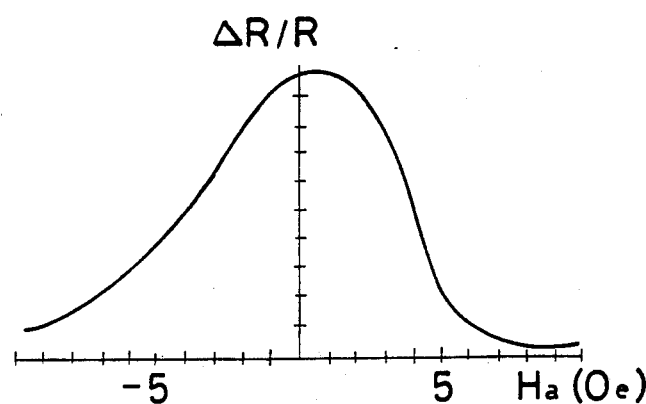
FIG. 4 to 6 are $\Delta R/R$ wave diagrams for different values of each anisotropic axis angle $\theta$.

The ΔR/R curve in FIG. 4 is a case illustrating that magnetization switching has not occurred, with only unsymmetrical characteristics appearing. The ΔR/R curve in FIG. 5 is a case illustrating that magnetization switching occurred, at either the positive side area or the negative side area of the external magnetic field Ha. The ΔR/R curve in FIG. 6 is a case illustrating that magnetization switching has occurred at both positive and negative side areas of the external magnetic field Ha. However, such magnetization switching, as illustrated in FIG. 6, differs from the Barkhausen noise, illustrated in FIG. 10 (f). When an external magnetic field Ha is applied within either the positive or negative side areas, magnetization switching does not occur.

Figure 5:
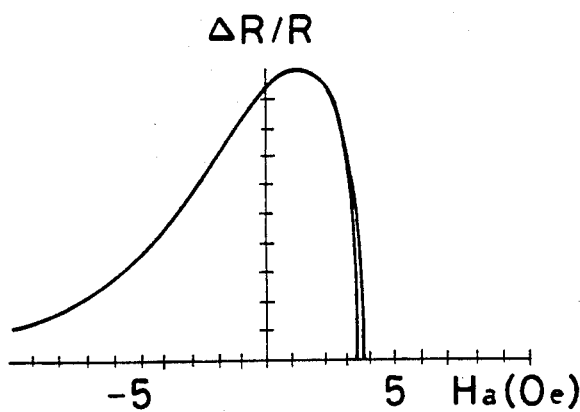
Figure 6:
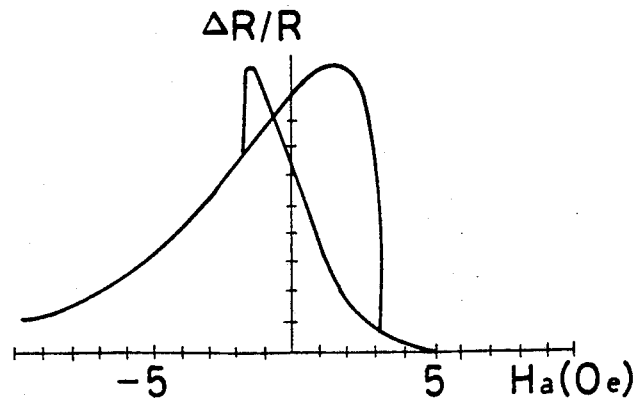

As a consequence, magnetization switching as the cause of Barkhausen noise is illustrated in FIG. 5. The range of anisotropic inclination angle $\theta$ which makes the ΔR/R curve in FIG. 5, (including a minimum inclination angle $\theta_1$, and a maximum inclination angle $\theta_2$), are calculated as illustrated in chart 1, when the $H_E$ values is changed in the range of 0.5-2.0 [Oe]. In this case, both the minimum inclination angle $\theta_1$ and the maximum inclination angle $\theta_2$ have the same result in both negative and positive values. Additionally, the positive value has a clockwise angle, and the negative value has a counterclockwise angle.

| Chart 1 | | | | | |
|---|---|---|---|---|---|
| $H_E$ (Oe) | $\theta_1$ (•) | $\theta_z$ (•) | $H_E$ (Oe) | $\theta_1$ (•) | $\theta_z$ (•) |
| 0.5 | 7.18 | 7.24 | 1.3 | 18.97 | 20.28 |
| 0.6 | 8.63 | 8.73 | 1.4 | 20.49 | 22.22 |
| 0.7 | 10.08 | 10.24 | 1.5 | 22.02 | 24.30 |
| 0.8 | 11.54 | 11.97 | 1.6 | 23.58 | 26.57 |
| 0.9 | 13.00 | 13.37 | 1.7 | 25.15 | 29.11 |
| 1.0 | 14.48 | 15.00 | 1.8 | 26.74 | 32.08 |
| 1.1 | 15.96 | 16.68 | 1.9 | 28.36 | 35.90 |
| 1.2 | 17.46 | 18.44 | 2.0 | 30.00 | 45.00 |

The angle dispersion of the easy axis in the MR element (2) is greatly influenced by the surface roughness of the substrate on which it is formed. For example, in a surface roughness of about 10 Å for a glass substrate, the local inclination angle of the easy axis of magnetization caused by the angle dispersion in the MR element (2) is a maximum of ±20° or so. However, the base surface roughness of the MR element (2) formed on the YMR head is more than about 20 Å. In this case, the local inclination angle of the easy axis of magnetization caused by the angle dispersion in the MR element (2) may be a maximum of ±40° or so. Even in such cases, preferably it is better to cause magnetization switching in one area of the positive or negative sides of magnetic field Ha, this is the signal magnetic field, as illustrated in FIG. 2 (f).

Here, let us say, a weak magnetic field is applied to the MR element (2) by the ferromagnetic film (3), and the MR element (2) is in a single magnetic domain condition. In this case, if the MR element (2) anisotropic inclination angle $\theta$ is set at about 40°, Barkhausen noise caused by the angle dispersion in the MR element (2) can be suppressed. This is because when the local inclination angle of the easy axis of magnetization caused by the angle dispersion of the MR element (2) is at a maximum of ±40°. If the anisotropic inclination angle $\theta$ is set at 40°, the easy axis of magnetization on the MR element (2) is dispersed in the range of 0°–80°, hence no counterclockwise inclined area exists, in this case.

On the other hand, concerning the case in which the above mentioned MR element (2) anisotropic inclination angle $\theta$ is set at 50°, if the local inclination angle of the easy axis of magnetization, caused by the angle dispersion in the MR element (2), is at a maximum of ±40°, in this case, the easy axis of magnetization on the MR element (2) will disperse in the range of 10°–90° C. In this case as well, Barkhausen noise can be suppressed. However, if the anisotropic inclination angle $\theta$ is set at 50°, the MR element (2) permeability will remarkably decline, which causes a reduction in reproducing sensitivity.

If the MR element (2) anisotropic inclination angle $\theta$ is set at 60°, the easy axis of magnetization in the MR element (2) disperses in the range of 20°–100° C., which causes a further reduction in reproducing sensitivity. At the same time, in the area where the direction of the easy axis of magnetization exceeds 90°, a magnetic domain wall is generated in the MR element (2), and it is possible to cause Barkhausen noise by an irreversible magnetic domain wall movement caused by the signal magnetic field application. As a consequence, the upper limit of an anisotropic inclination angle $\theta$ is around 40°.

Even in cases when $H_E = 1.0$ [Oe], and the maximum local inclination angle of the easy axis of magnetization caused by the angle dispersion in the MR element (2) is ±40° and unchanged, and the MR element (2) anisotropic inclination angle $\theta$ is set at around 30°, Barkhausen noise caused by angle dispersion in the MR element (2) can be avoided. In other words, as mentioned above, if the anisotropic inclination angle $\theta$ is set at around 30°, the easy axis of magnetization disperses in the range of 10°–70° C., and the area inclining counterclockwise exists in the range of −10°–0° C.

However, magnetic switching occurs in either the positive or negative side areas of the magnetic field Ha, and the signal magnetic field, when only the easy axis of magnetization in the MR element (2) inclines by about 14.5°–15° C. to the positive or negative side, as is illustrated in chart 1. Hence, no magnetization switching will occur even in the area of counterclockwise inclination in a range of −10°–0° C. as in the above case. Because of this, when the magnetic field Ha, the signal magnetic field, is applied, the magnetization switching causing Barkhausen noise will not occur in the positive area of Ha.

Consequently, if the MR element (2) operating point is set in the positive area, Barkhausen noise can be suppressed. Also, if the anisotropic angle $\theta$ is set at −30°, the MR element (2) operating point can be set in the negative area.

When $H_E = 1.5$ [Oe] and the local inclination angle of the easy axis of magnetization caused by the angle dispersion in the MR element (2) is a maximum of ±40° and unchanged, if the MR element (2) anisotropic inclination angle $\theta$ is set at about 18°, Barkhausen noise caused by the angle dispersion in the MR element (2) can be avoided. This is because, as chart 1 illustrates $\theta_1$ of $H_E = 1.5$ [Oe] is approximately 22°.

However, $H_E = 1.5$ [Oe] is a rather large magnetic field value, which is very difficult to apply to the entire MR element (2) area. Also, even if this value could be realized by the actual YMR head, a drastic output declination will be caused, because the MR element (2) anisotropic magnetic field $H_K$ is 4–5 [Oe]. Because of this, when the local inclination angle of the easy axis of magnetization caused by the angle dispersion in the MR element (2) is a maximum of ±40°, it is realistic to set the anisotropic inclination angle $\theta$ at more than about 30°.

On the other hand, it is possible to control the inclination angle of the easy axis of magnetization caused by the angle dispersion in the MR element (2) to a maximum of ±30° or so, in this case, the anisotropic inclination angle $\theta$ is sufficient to be about 20°, for the above mentioned reasons. However, when compared to the MR element (2), with an inclination angle of the easy axis of magnetization controlled at a maximum of ±40° or so, this condition is unavoidably disadvantageous in a manufacturing condition.

Consequently, it is to be determined whether to make the anisotropic inclination angle $\theta$ to be 20° by controlling the local inclination angle of the easy axis of magnetization caused by the angle dispersion in MR element (2) at a maximum of ±30° or so, or to make the anisotropic inclination angle $\theta$ to be more than 30° for easing the angle dispersion in the MR element (2) conditions, where these possibilities are weighed against the manufacturing conditions, the production costs, etc. Thus there is an inseparable relationship between the angle dispersion in the MR element (2) scale and the anisotropic inclination angle $\theta$ value, and for the above mentioned reasons, it is appropriate to set the MR element (2) anisotropic inclination angle $\theta$ in the range of 20°–40° C.

The YMR head related to an embodiment of this invention, as previously mentioned, is a YMR head that includes a MR element, that detects the signal magnetic field generated in the magnetic recording medium as a resistance change, a yoke, that leads magnetic flux from the head gap to the above mentioned MR element, a DC magnetic field application system, that applies a desirable Weak magnetic field to the longitudinal direction of the above mentioned MR element, and a conductor, that applies a desirable bias magnetic field in the strip width direction of the above mentioned MR element wherein the special feature is that the easy axis of magnetization of the above mentioned MR element is inclined in a range of 20°–40° C. to the longitudinal direction of the MR element. Also, the above mentioned magnetic recording medium may be made of magnetic tape or disk. The above mentioned MR element may be a thin film shaped magnetic sensor with a longitudinal direction and a strip width direction, and structured so that the application of a detection current to its longitudinal direction will convert signal magnetic field changes to an output voltage that corresponds to the resistance change at both ends of the MR element.

Based on the above structure, to either the positive or negative side areas in the magnetic field Ha, corresponding to the signal magnetic field, that is the axis of abscissa of the $\Delta R/R$ curve, the points causing discontinuous jumps can be removed. As a consequence, when the MR element operating point is shifted to a point having excellent linearity by a bias magnetic field, if such an operating point is set in the above mentioned area without discontinuous jumps in the above mentioned magnetic field Ha, magnetization switching, which occurs in the magnetic field area with the same direction as the bias magnetic field, can be suppressed. Therefore, Barkhausen noise caused by this magnetization switching can be suppressed, and the reproduced output signal reproduced by such a YMR head can be made to be of high fidelity.

In addition to this, the above mentioned DC magnetic field application system may be structured so that it applies a weak magnetic field caused by ferromagnetic exchange coupling with the MR element on the longitudinal direction of the MR element, which causes the MR element to be in a single magnetic domain condition. Because of this, the discontinuous changes of the internal magnetization in the MR element can be avoided.

The above mentioned DC magnetic field application system may be made to a thickness of 1000–2000 Å ferromagnetic film, with a large magnetic coercive force and high electric conductivity. The above mentioned conductor may be made of Al-Cu thin-film or another conductive metal thin film, and by controlling a current applied thereto, it causes a desirable bias magnetic field in the above MR element strip width direction, which shifts the MR element operating point to a point having excellent linearity. The above mentioned yoke may be structured by an upper side yoke, made of 0.5–1.0 μm permalloy, and a lower side yoke, made of a highly permeable magnetic substrate, and structured so that it can form magnetic flux introduction that leads the signal magnetic field to the above mentioned MR element.

The above mentioned head gap may be set at 0.2–0.8 μm so that the signal magnetic field with about a minimum 0.5 μm wave length can be reproduced from the magnetic recording medium, and structured such that a spacing can be formed between the magnetic recording medium and the head gap. In addition to this, the above mentioned MR element may be structured, at the manufacturing time, such that by setting its easy axis of magnetization with a 20°–40° C. incline to the MR element longitudinal direction, it can ease the anisotropic axis angle condition, and attain output characteristic having excellent linearity.

Thus, structurally, this invention inclines the easy axis of magnetization of the MR element to the MR element longitudinal direction by 20°–40° C., so all directions of the easy axis of magnetization become either almost clockwise or counterclockwise. As a result, the condition of the angle dispersion of the easy axis of both positive and negative directions can be relaxed. Because of this, magnetization switching that accompanies large angle dispersion of the easy axis can be avoided, and the occurrence of Barkhausen noise as well can be avoided.

The above mentioned MR element can make the magnetic head itself compact, and avoid non-linear characteristics in reproduced output signals with a non-complicated simple structure by only inclining the easy axis of magnetization to the longitudinal direction of MR element by 20°–40° C. at manufacturing time.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A yoke thin-film magneto-resistive head comprising:
    a magneto-resistive element having a first end and a second end opposite thereto for detecting a first signal magnetic field that occurs in a magnetic recording medium as a resistance change;
    a yoke for leading magnetic flux from a head gap to said magneto-resistive element;
    DC magnetic field application means for applying a second magnetic field to the longitudinal direction of said magneto-resistive element, the value of said second magnetic field being less than the value of said first signal magnetic field; and
    a conductor for applying a third bias magnetic field to said magneto-resistive element in a strip width direction, the easy axis of magnetization of said magneto-resistive element being inclined by more than 20° and not more than 40° to a longitudinal direction of said magneto-resistive element.

2. A yoke type thin-film magneto-resistive head according to claim 1, wherein said magnetic recording medium is a magnetic tape or a disk.

3. A yoke type thin-film magneto-resistive head according to claim 1, wherein said magneto-resistive element is a thin film shaped magnetic sensor with longitudinal direction and said strip width direction, and converts said resistance change of said first signal magnetic field to an output voltage, corresponding to said first and second ends of said magneto-resistive element, by applying a detection current in the longitudinal direction of said magneto-resistive element.

4. A yoke type thin-film magneto-resistive head according to claim 1, wherein said DC magnetic field application means causes said magneto-resistive element to be in a single magnetic domain condition in response to the application of said second magnetic field developed by a ferromagnetic exchange coupling between said magneto-resistive element and ferromagnetic film with said magneto-resistive element to the longitudinal direction of said magneto-resistive element.

5. A yoke type thin-film magneto-resistive head according to claim 1, wherein said DC magnetic field application means is made of a thickness from 1000 Å–2000 Å of ferromagnetic film, with a magnetic coercive force and electric conductivity.

6. A yoke thin-film magneto-resistive head according to claim 1, wherein said conductor is a conductive metal thin film, and shifts the operating point of said magneto-resistive element to a point having excellent linearity by generating a predetermined bias magnetic field in said strip width direction of said magneto-resistive element in response to a current applied thereto.

7. A yoke type thin-film magneto-resistive head according to claim 6, wherein said conductor comprises an Al-Cu thin-film.

8. A yoke type thin-film magneto-resistive head according to claim 1, wherein said yoke comprises any upper yoke, made of a permalloy film having a thickness of 0.5–1.0 μm and a lower side yoke, made of magnetic substrate with a magnetic permeability, and said yoke introducing said magnetic flux and leading said first signal magnetic field to said magneto-resistive element.

9. A yoke type thin-film magneto-resistive head according to claim 1, wherein said head gap is set at 0.2–0.3 μm so that said first signal magnetic field having a minimum wavelength of 0.5 μm from said magnetic recording medium can be reproduced.

10. A yoke type thin-film magneto-resistive head according to claim 1, wherein said magneto-resistive element inclines said easy axis of magnetization of said magneto-resistive element by more than 20° and not more than 40° C. in said longitudinal direction of said magneto-resistive element for enhancing the linearity of the output characteristics and easing anisotropic angle dispersion conditions at manufacturing time.

11. A method for detecting signals recorded in a magnetic recording medium, comprising the steps of:
    (a) detecting a first signal magnetic field that occurs in the magnetic recording medium responsive to a resistance change by a magneto-resistive element;
    (b) leading magnetic flux from a head gap to said magneto-resistive by a yoke;
    (c) applying a second magnetic field to the longitudinal direction of said magneto-resistive element, the value of said second magnetic field being less than the value of said first signal magnetic field;
    (d) applying a third bias magnetic field to said magneto-resistive element in a strip width direction; and
    (e) inclining the easy axis of magnetization of said magneto-resistive element by more than 20° and not more than 40° C. to the longitudinal direction of said magneto-resistive element.

12. A method according to claim 11, further comprising the step of converting said resistance change of said first signal magnetic field to an output voltage by applying a detection current in the longitudinal direction of said magneto-resistive element.

13. A method according to claim 11, further comprising the step of causing said magneto-resistive element to be in a single magnetic domain condition in response to the application of said second magnetic field developed by a ferromagnetic exchange coupling between said magneto-resistive element and ferromagnetic film with said magneto-resistive element to the longitudinal direction of said magneto-resistive element.

14. A method according to claim 11, further comprising the steps of:
generating a predetermined bias magnetic field in said strip width direction of said magneto-resistive element in response to a current applied thereto; and
shifting the operating point of said magneto-resistive element to a point having excellent linearity.

15. A yoke type thin-film magneto-resistive head having a rectangular parallelepiped shape with a longitudinal direction and a strip width direction perpendicular to the longitudinal direction and an easy axis of magnetization, comprising:
a magneto-resistive element having a first end and a second end opposite thereto for detecting a signal magnetic field that occurs in a magnetic recording medium as a resistance change across said first and second ends;
a plurality of yokes for leading magnetic flux from a head gap to said magneto-resistive element;
DC magnetic field application means for applying a weak magnetic field to the longitudinal direction of said magneto-resistive element so as to cause said magnetic-resistive element to be in a single magnetic domain condition; and
a conductor for producing a bias magnetic field which is applied to said magneto-resistive element in the strip width direction in order to shift an operating point of said magneto-resistive element to a point having excellent linearity;
whereby the easy axis of magnetization of said magneto-resistive element is inclined by more than 20° and not more than 40° C. to the longitudinal direction.

16. A yoke type thin-film magneto-resistive head having a rectangular parallelepiped shape with a longitudinal direction and a strip width direction perpendicular to the longitudinal direction and an easy axis of magnetization, comprising:
a magneto-resistive element having a first end and a second end opposite thereto for detecting a signal magnetic field that occurs in a magnetic recording medium as a resistance change across said first and second ends;
a plurality of yokes for leading magnetic flux from a head gap to said magneto-resistive element;
DC magnetic field application means for applying a weak magnetic field to the longitudinal direction of said magneto-resistive element so as to cause said magnetic-resistive element to be in a single magnetic domain condition; and
a conductor for producing a bias magnetic field which is applied to said magneto-resistive element in the strip width direction in order to shift an operating point of said magneto-resistive element to a point having excellent linearity;
whereby the easy axis of magnetization of said magneto-resistive element is inclined by 30° to 40° C. to the longitudinal direction.

* * * * *